United States Patent
Bash et al.

(10) Patent No.: US 12,211,390 B2
(45) Date of Patent: Jan. 28, 2025

(54) SYSTEM AND METHOD FOR IMPROVING EFFICIENCY OF DELIVERY VIA UNMANNED AERIAL VEHICLES

(71) Applicant: Flytrex Aviation Ltd., Tel Aviv (IL)

(72) Inventors: Yariv Bash, Tel Aviv (IL); Amit Regev, Tel Aviv (IL); Ophir Marko, Netanya (IL)

(73) Assignee: Flytrex Aviation Ltd., Tel Aviv (IL)

( * ) Notice: Subject to any disclaimer, the term of this patent is extended or adjusted under 35 U.S.C. 154(b) by 458 days.

(21) Appl. No.: 17/510,812

(22) Filed: Oct. 26, 2021

(65) Prior Publication Data

US 2022/0130265 A1  Apr. 28, 2022

Related U.S. Application Data

(60) Provisional application No. 63/105,597, filed on Oct. 26, 2020.

(51) Int. Cl.
*G08G 5/00* (2006.01)
*G05D 1/00* (2006.01)
*B64U 101/64* (2023.01)

(52) U.S. Cl.
CPC ......... *G08G 5/0069* (2013.01); *G05D 1/0094* (2013.01); *B64U 2101/64* (2023.01)

(58) Field of Classification Search
None
See application file for complete search history.

(56) References Cited

U.S. PATENT DOCUMENTS

2018/0137454 A1* 5/2018 Kulkarni ............... G05D 1/021

\* cited by examiner

*Primary Examiner* — Hongye Liang
(74) *Attorney, Agent, or Firm* — M&B IP Analysts, LLC

(57) ABSTRACT

A method and system for optimizing drone delivery efficiency. The method includes determining an optimal intermediate location for a UAV based on historical payload delivery data related to a payload carried by the UAV, wherein the distance between the optimal intermediate location and each of a group of potential recipient devices is less than a predetermined threshold; causing the UAV to navigate to the optimal intermediate location; sending, to each potential recipient device having a probability of requesting the payload carried by the UAV which exceeds a predetermined threshold, a notification indicating the payload carried by the unmanned aerial vehicle; receiving, from a first potential recipient device of the potential recipient devices, a request to deliver the payload; and causing the UAV to navigate from the optimal intermediate location to a location of the first potential recipient device when the request to deliver the payload is received.

19 Claims, 5 Drawing Sheets

SYSTEM AND METHOD FOR IMPROVING EFFICIENCY OF DELIVERY VIA UNMANNED AERIAL VEHICLES

CROSS-REFERENCE TO RELATED APPLICATIONS

This application claims the benefit of U.S. Provisional Application No. 63/105,597 filed on Oct. 26, 2020, now pending, the contents of which are hereby incorporated by reference.

TECHNICAL FIELD

The disclosure generally relates to a system for improving delivery logistics and particularly to optimizing delivery of items for a given geographical area.

BACKGROUND

Optimization of delivery logistics is advantageous to a company using drone technology for delivery. Payload delivery may be time sensitive such that the intended recipient of the delivery may terminate their request if delivery is not sufficiently prompt. This can result in wasted energy and increases wear and tear on the drone which is dispatched to a location only for the request to be rescinded and the drone having to return with the full payload.

As unmanned aerial vehicles (UAVs) or drones are being increasingly used for delivery of parcels, goods, food, and more, refined logistics in addition to marketing techniques provide an added benefit.

Moreover, delivery locations do not always remain static. In some instances, a drone may be dispatched to an initial delivery location only for the intended recipient to be elsewhere. This can further waste resources needed to fly the drone to the ultimate destination (i.e., the current location of the recipient).

Likewise, increasing sales and productivity is always a priority for a company. Improving efficiency of drone deliveries can have positive effects on profitability and can boost sales, leading to financial benefits in addition to reducing waste of resources.

The purpose of advertising is to persuade a consumer to request delivery of a payload. Successful advertising is able to identify consumers who are most likely to be willing to pay for a company's payloads or services. Marketing is a discipline which involves identifying customer needs and defining how best to meet those needs.

It would therefore be advantageous to provide systems and methods which can improve efficiency of drone delivery.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for optimizing drone delivery efficiency. The method comprises: determining an optimal intermediate location for an unmanned aerial vehicle (UAV) based on historical payload delivery data related to a payload carried by the UAV, wherein the distance between the optimal intermediate location and each of a plurality of potential recipient devices is less than a predetermined threshold; causing the UAV to navigate to the optimal intermediate location; sending, to each potential recipient device having a probability of requesting the payload carried by the UAV which exceeds a predetermined threshold, a notification indicating the payload carried by the unmanned aerial vehicle; receiving, from a first potential recipient device of the plurality of potential recipient devices, a request to deliver the payload; and causing the UAV to navigate from the optimal intermediate location to a location of the first potential recipient device when the request to deliver the payload is received from the first potential recipient device.

Certain embodiments disclosed herein also include a non-transitory computer readable medium having stored thereon causing a processing circuitry to execute a process, the process comprising: determining an optimal intermediate location for an unmanned aerial vehicle (UAV) based on historical payload delivery data related to a payload carried by the UAV, wherein the distance between the optimal intermediate location and each of a plurality of potential recipient devices is less than a predetermined threshold; causing the UAV to navigate to the optimal intermediate location; sending, to each potential recipient device having a probability of requesting the payload carried by the UAV which exceeds a predetermined threshold, a notification indicating the payload carried by the unmanned aerial vehicle; receiving, from a first potential recipient device of the plurality of potential recipient devices, a request to deliver the payload; and causing the UAV to navigate from the optimal intermediate location to a location of the first potential recipient device when the request to deliver the payload is received from the first potential recipient device.

Certain embodiments disclosed herein also include a system for optimizing drone delivery efficiency. The system comprises: a processing circuitry; and a memory, the memory containing instructions that, when executed by the processing circuitry, configure the system to: determine an optimal intermediate location for an unmanned aerial vehicle (UAV) based on historical payload delivery data related to a payload carried by the UAV, wherein the distance between the optimal intermediate location and each of a plurality of potential recipient devices is less than a predetermined threshold; cause the UAV to navigate to the optimal intermediate location; send, to each potential recipient device having a probability of requesting the payload carried by the UAV which exceeds a predetermined threshold, a notification indicating the payload carried by the unmanned aerial vehicle; receive, from a first potential recipient device of the plurality of potential recipient devices, a request to deliver the payload; and cause the UAV to navigate from the optimal intermediate location to a location of the first potential recipient device when the request to deliver the payload is received from the first potential recipient device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings:

DETAILED DESCRIPTION

Figure 1:
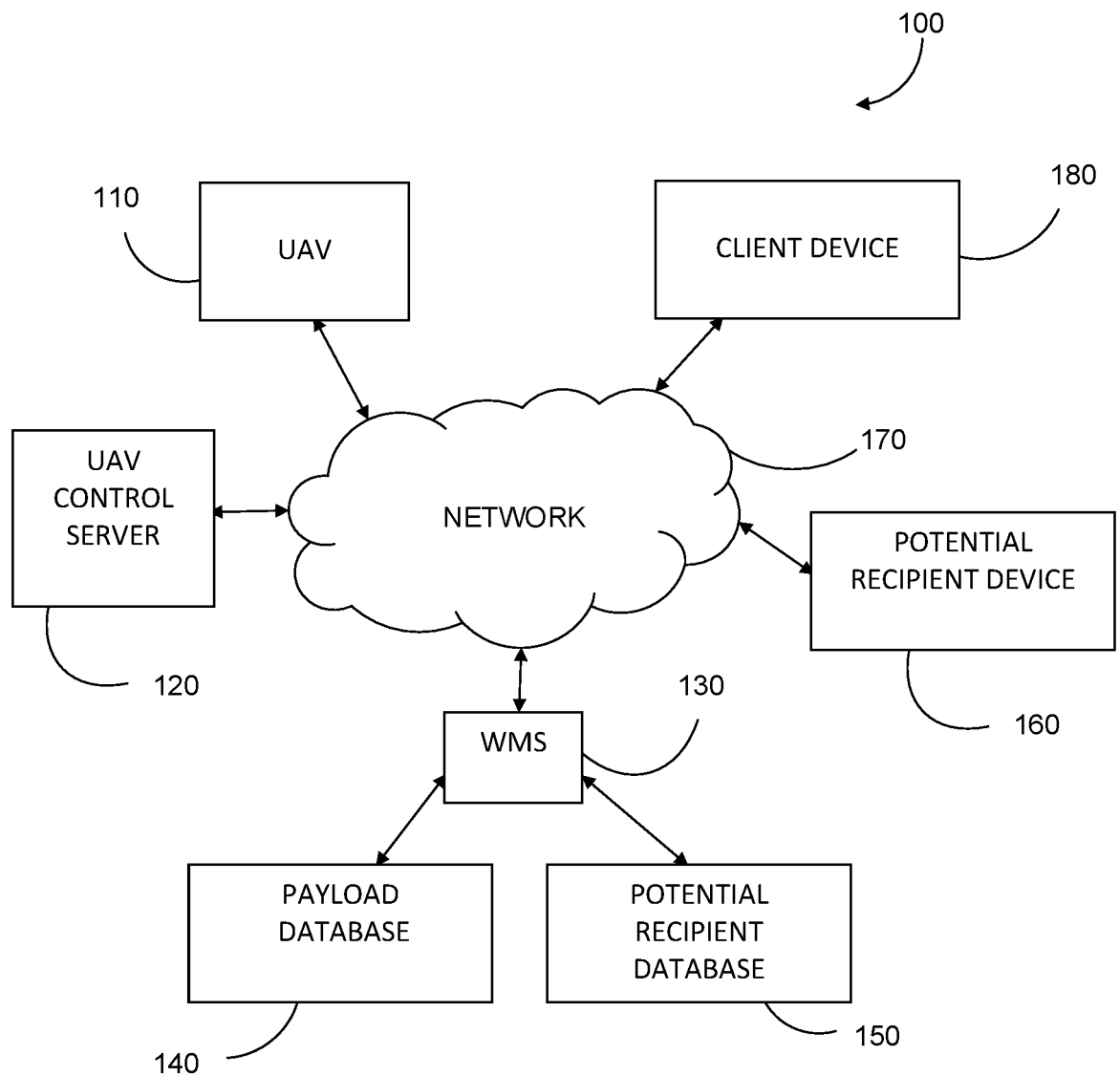
FIG. 1 is a network diagram illustrating a UAV delivery platform operating in a network environment according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include techniques for improving efficiency of payload delivery via UAVs. In an embodiment, an optimal intermediate location is determined for a UAV based on historical payload delivery data related to one or more payloads carried by the UAV. The optimal intermediate location is determined such that the distance between that location and respective locations of each of a plurality of potential recipient devices is below a threshold. The UAV is caused to navigate to the optimal intermediate location, for example by sending a navigation plan or otherwise sending navigation instructions for navigating to the optimal intermediate location.

A notification indicating the payload carried by the UAV is generated and sent to one or more potential recipient devices having locations within the threshold distance from the optimal intermediate location and also having probabilities of requesting delivery of such a payload above a threshold. The probability of any given potential recipient device requesting delivery of a particular payload may be based on a type of the payload (e.g., a type of product being carried by the UAV as the payload) and based further on historical delivery data related to the potential recipient device (e.g., data indicating past UAV deliveries requested by the potential recipient device).

A request to deliver the payload is received from a first potential recipient device of the potential recipient devices to which the notification was sent. When such a request is received, the navigation by the UAV from the optimal intermediate location to the current location of the first potential recipient device is caused (e.g., by sending a navigation plan or otherwise sending navigation instructions for navigating to the location of the first potential recipient device, or a predetermined delivery location closest to the location of the first potential recipient device, from the optimal intermediate location where the UAV is currently located).

In some embodiments, additional payloads to be carried by the UAV are determined. When such additional payloads are determined, the UAV is only caused to navigate to the optimal intermediate location when a storage area of the UAV (i.e., a part or parts of the UAV in which payloads can be stored) includes the additional payloads. In a further embodiment, the UAV is caused to navigate to a location of a second potential recipient device that requested one of the additional payloads without first navigating to an origin location (i.e., without returning to the origin between delivering the initial payload to a first potential recipient device and delivering the additional payload to the second potential recipient device).

The additional payloads are determined at least based on remaining capacity (by volume, weight, or both) of the UAV after one or more initial payloads are loaded into a storage area of the UAV. The additional payloads may be determined based further on historical payload delivery data related to the optimal intermediate location to which the UAV will navigate. As a non-limiting example, an additional payload of a type of payload that has the highest likelihood of being requested based on historical delivery requests in locations within a threshold distance of the optimal intermediate location that also fits in the remaining cargo space of a drone may be determined as the additional payload to be carried.

Alternatively or collectively, the additional payloads may be determined based on clusters of payloads indicated in the historical payload delivery data and a type of the initial payloads. As a non-limiting example, when a first payload is a slice of pizza, historical payload data may indicate that slices of pizza are typically delivered with a cup of soda (i.e., as indicated by cluster data including slices of pizza and cups of soda as types of payloads historically delivered together) such that the additional payloads include a second payload that is a cup of soda.

The disclosed embodiments include techniques for improving efficiency of UAV delivery that allow for reducing the amount of time needed to deliver a payload via a UAV after receiving a request for such a delivery. The disclosed embodiments further allow for shortening the total distance drones need to navigate in at least some circumstances such as when the payload request is time-sensitive and would be revoked after a period of time has passed or when the location for the delivery changes, for example due to movement of the recipient to whom a payload should be delivered.

More specifically, by first causing the UAV to navigate to an optimal intermediate location that is determined based on historical payload data related to the payload the UAV is carrying, the UAV is positioned so as to minimize the distance between the UAV and a potential recipient device that requests the payload once such a request is received. This, in turn, reduces the time to deliver the package once the request has been received.

Additionally, by navigating to an optimal intermediate location rather than navigating directly from a location of origin of the UAV to the location of the requesting potential recipient device, the total amount of distance needed to be navigated by the UAV can be reduced as compared to navigating directly from a location of origin of the UAV to the location of the potential recipient device when the potential recipient device is mobile (i.e., when the final delivery location changes between when the request is received and when the UAV would otherwise deliver the payload due to movement of a potential recipient using the potential recipient device that requested the payload delivery).

Moreover, embodiments in which additional payloads to be carried by the UAV are determined based on remaining storage capacity and historical payload delivery allow for utilizing delivery resources of the UAV (e.g., fuel or battery power) more efficiently as compared to delivering the same number of total payloads via separate missions. In particular, the remaining storage capacity of the UAV can be utilized as efficiently as possible rather than sending the UAV to deliver the initial payloads with unused storage capacity. Thus, the additional payloads can also be delivered efficiently by navigating to the optimal intermediate location and only navigating to specific potential recipient devices once the UAV is in the vicinity of the optimal intermediate location instead of prompting the UAV to return to an origin location (e.g., a warehouse or other facility storing payloads) between deliveries. Thus, the total distance navigated by the UAV (and, thus, the consumption of other resources such as fuel or power) is reduced as compared to delivering each payload in a separate mission beginning at a payload storage facility and ending at a respective final delivery location.

FIG. 1 is a network diagram 100 illustrating a UAV delivery platform operating in a network environment implemented in accordance with an embodiment. The UAV delivery platform includes a UAV 110 and a UAV control server 120. The UAV control server 120 is communicatively connected to a network 170. In an embodiment, the network 170 may be configured to provide connectivity of various sorts, as may be necessary, including but not limited to, wired and/or wireless connectivity, including, for example, local area network (LAN), wide area network (WAN), metro area network (MAN), worldwide web (WWW), low power WAN (LPWAN), Internet, and any combination thereof, as well as cellular connectivity. The UAV control server 120 is configured to control autonomous vehicles, for example by sending them executable navigation plans, instructing when to receive/deliver a payload, and the like. In this example embodiment, the control server 120 is communicatively connected via the network 170 with a UAV or drone 110.

A warehouse management system (WMS) 130 allows for controlling, directing, and tracking warehouse operations from the time goods enter a warehouse until they leave. The WMS 130 includes or is communicatively connected to a payload database 140 and a potential recipient database 150. The payload database 140 includes data on payloads, such as SKUs (Stock Keeping Units), payload description, inventory number, warehouse storage location, and the like. The payload database 140 may further include metadata such as clusters of payloads (i.e., which types of payloads are historically delivered together), payloads or clusters of payloads delivered to households, and payloads or cluster of payloads delivered to recipients with common demographics. The potential recipient database 150 may include data about potential recipient devices utilized by potential recipients of payloads and demographics such as name, age, location, household members, marital status, delivery history, and the like. The WMS 130 is communicatively connected to the network 170.

A client device 180 is further communicatively connected to the network 170. The client device 180 may be a computing device of a delivery or logistics company. The client device 180 may include a user interface (not shown) for receiving, from a user, requests to perform actions. An action may be, for example, dispatching a UAV from a first location to deliver goods at a second location. Another example may be a request to dispatch a delivery vehicle from a first location to a second location, where the delivery vehicle is provided a payload which is then delivered to a third location. The client device 180 may request that a UAV control server 120 send navigational plans and instructions to a UAV controlled by the UAV control server 120. The client device 180 may further send requests to the WMS 130, and send or receive requests from a potential recipient device 160. A client device 180 may be, for example, a laptop, desktop, personal computer, mobile phone, smartphone, and the like. A potential recipient device 160, which is further communicatively connected to the network 170, is a computing device of the recipient of the payload or parcel. A potential recipient device 160 may be, for example, a laptop, desktop, personal computer, mobile phone, smartphone, IoT device, and the like.

According to an embodiment, the client device 180 may select a payload from the payload database 140 to designate as a deliverable payload. The client device 180 may further determine an area including a plurality of locations, where each location is associated with a potential recipient device indicated in the potential recipient database 150. A location of a potential recipient device may be part of the determined area if, for example, data from the potential recipient database 150 indicates there is a probability at or exceeding a threshold that the potential recipient device will request delivery of the deliverable payload. Based on the plurality of locations, the UAV control server 120 (or, in some embodiments, the client device 180) may determine an optimal intermediate location, and configure a UAV having a payload comprising the deliverable payload to navigate from a first location to the optimal intermediate location. The optimal intermediate location may be a location from which a distance is calculated to each location of the plurality of locations, such that a delivery request from each of the locations will result in a short distance travelled by the UAV. For example, if there are two locations which have an equal probability of requesting delivery of the payload, a UAV may be configured to select an optimal location at equidistance from the two locations. In certain embodiments, the optimal intermediate location is further based on a next location of the UAV, i.e. the location to which the UAV will navigate to after completing the delivery.

The client device 180 may send a notification to a potential recipient device associated with each of the plurality of locations, alerting the potential recipient using the potential recipient device that a payload for which they may request delivery is available. Upon receiving a request from a potential recipient device to deliver the payload, the client device 180 may send a request to the UAV control server 120 to configure the UAV to navigate to the location of the potential recipient device from which the request was received.

In another embodiment, a client device 180 receives a request from a potential recipient device 160 to deliver a payload and to deliver the payload to a first delivery location of the potential recipient device 160. For example, the payload may be an extra cheese pizza from a first location. The client device sends a request, to the UAV control server 120, to send a UAV to the first location to pick up the payload. In an embodiment, the client device 180 may send a notification to a computing device associated with a user of the first location, such as an ordering terminal used by restaurant staff. Based on data stored in the potential recipient database 150, the client device 180 may determine one or more other payloads from the first delivery location which have a probability exceeding a threshold value to be delivered to potential recipient devices located a distance which is at or less than a predetermined threshold.

In an embodiment, a number of potential recipient devices meeting the probability threshold may be determined (e.g., a condition may be at least 4 potential recipient devices within a 200 meter radius). For example, the client device 180 may determine that, within 100 meters of the first potential recipient device location, there are 7 potential recipient device locations having potential recipients with a probability exceeding 80% to request delivery of a pepperoni pizza. The client device 180 may request a second payload of pepperoni pizza, and send a notification to the potential recipient devices of the 7 potential recipient device locations that a pepperoni pizza is available for immediate delivery in their area. If a potential recipient device requests delivery of the second payload, it may be delivered to a second potential recipient device location (associated with the second potential recipient device). This may increase the number of deliveries a UAV performs, thereby increasing the value derived from it.

Figure 2:
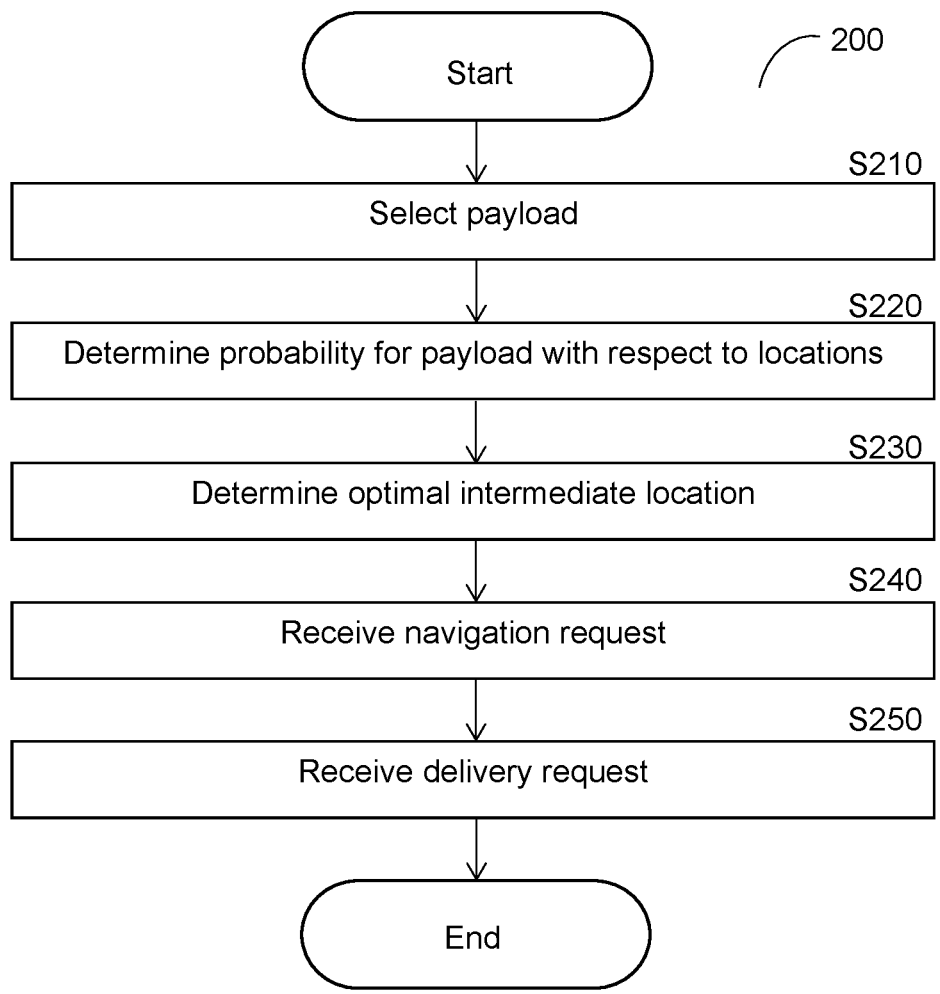
FIG. 2 is a flowchart illustrating a method for determining an optimal intermediate location according to an embodiment.

FIG. 2 is a flowchart 200 for determining optimal intermediate location according to an embodiment. In an embodiment, the method is performed by the UAV control server 120, FIG. 1.

At S210, a payload is selected from a payload database. A payload database may include data on payloads, such as price, SKUs (Stock Keeping Units), payload description, inventory number, ingredients, allergy information, temperature storage conditions, warehouse storage location, and the like. The payload database may further include metadata such as clusters of payloads (i.e. what payloads are delivered together together), clusters of payloads deliver at the same time (or within a threshold time of each other), payloads or clusters of payloads delivered to households, and payloads or cluster of payloads delivered to recipients having common demographics. In certain embodiments, a payload database may be implemented as an electronic table. For example, such a table may list a payload name in a first column, payload ingredients in a second column, and payload price in a third column, so that each row in the table corresponds to a single payload.

At S220, a probability for requesting delivery of the selected payload by a potential recipient device is determined for a potential recipient device at each of a plurality of potential recipient device locations. This probability value may be calculated, for example, by analyzing delivery history to determine delivery request trends, or by performing clustering of delivery histories of multiple potential recipients. Potential recipient information may be available from a potential recipient database, such as described in more detail herein. Clustering may be achieved by selecting an item from the delivery history, and determining correlation to one or more potential recipient data types. Geographical clustering may be determined by selecting an area location, determining potential recipient device locations in that area and examining delivery histories for potential recipients in that area. Furthermore, by selecting a specific geolocation or waypoint, delivery histories of potential recipients whose location is within a predetermined distance from the selected geolocation or waypoint may be selected for the methods described above. In an embodiment, probabilities of a plurality of possible locations may be determined.

At S230, an optimal intermediate location or waypoint is determined. The optimal intermediate location may be selected from among the plurality of potential recipient device locations in order to minimize the distance a UAV would navigate to a potential recipient device once the potential recipient device sends a request for delivery of the payload. In some embodiments, the optimal intermediate location may be further determined using a weighted score determined based on probabilities of requesting delivery of the payload.

As a non-limiting example, if a first potential recipient device is twice as likely to request delivery of a payload than a second potential recipient, then the optimal intermediate location may be determined to be such that the UAV is twice as close to the first location. That is, if there are 300 meters between the first location and the second location, and the potential recipient device at the first location is twice as likely to request delivery than the potential recipient device at the second location, then the optimal location may be determined such that the UAV is within 100 meters distance from the first location or within 200 meters distance from the second location.

Another example for determining an optimal intermediate location is described further below with respect to FIG. 3.

At S240, a navigation request to deploy a UAV at the optimal intermediate location is received. Based on the navigation request, a navigation plan is generated. The generated navigation plan includes instructions that configure a UAV to navigate to a departure location, to a pickup location, and to the determined optimal intermediate location. In some implementations, the departure location and pickup location may be the same location.

At optional S250, a request to deliver the payload is received from a potential recipient device. In an embodiment, when such a request is received, S250 further includes updating the navigation plan to add or replace the optimal intermediate location with a location associated with the potential recipient device that sent the request.

Figure 3:
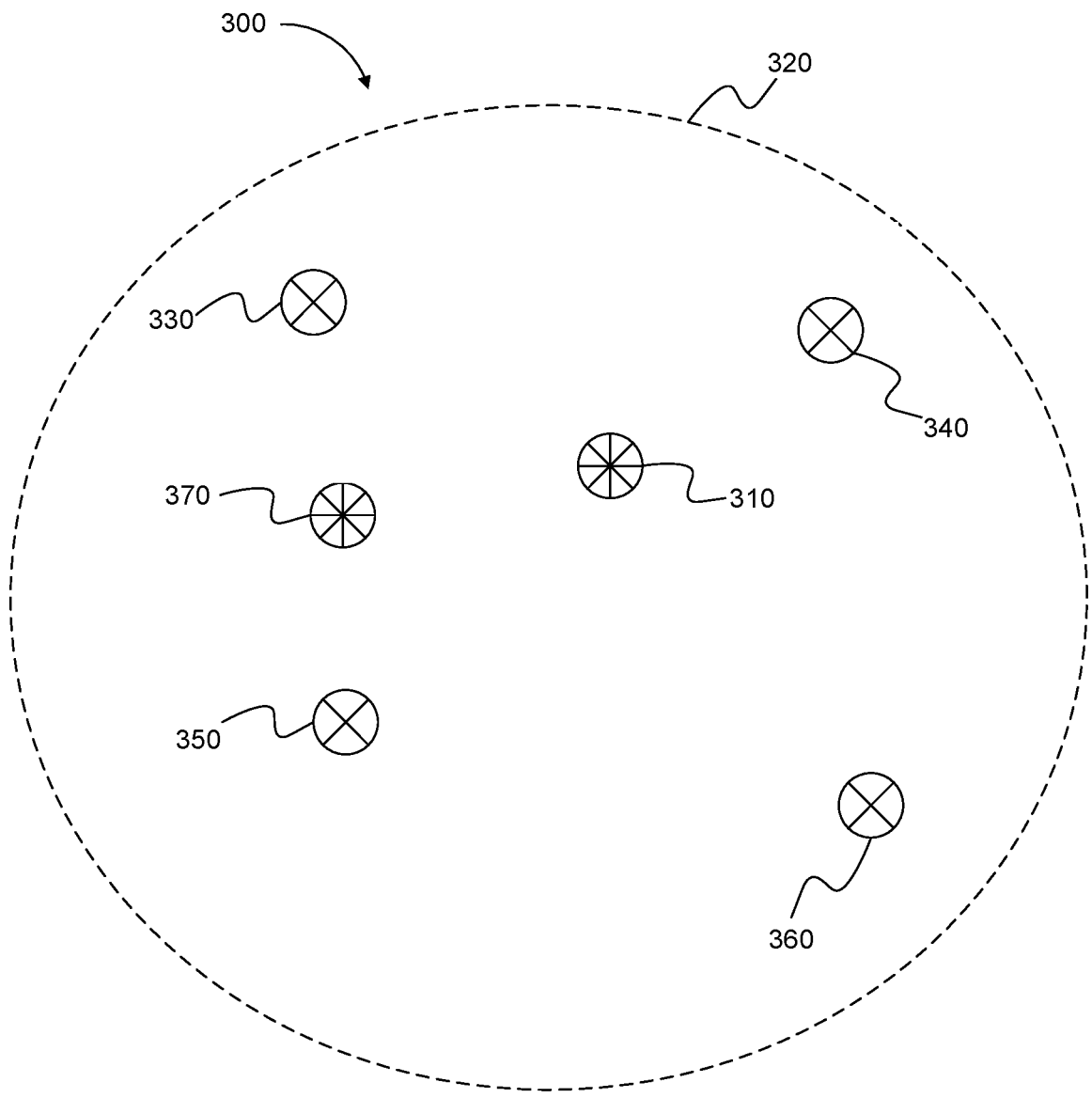
FIG. 3 is an illustration utilized to demonstrate determining an optimal intermediate location for payload requests according to an embodiment.

FIG. 3 is an example illustration 300 demonstrating determining the optimal intermediate location 310 for a delivery request implemented according to an embodiment. The example shown in FIG. 3 illustrates four potential recipients in a geographical area 320. Each determined probability of requesting delivery of a payload for potential recipients at potential recipient device locations number 1, 2 and 3 (labelled 330, 340, and 350, respectively) falls within a predetermined threshold (e.g., higher than 75%). In an example, the probability of the potential recipient device at location number 4 (i.e., potential recipient device location 360) is determined to be under the predetermined threshold and therefore is not taken into account.

A second optimal intermediate location 370 is determined by increasing the threshold for delivery request probability (e.g., from 75% to 85%). In this example, the probability of requesting delivery for potential recipients at potential recipient device location 330 and at potential recipient device location 340 each exceed the new threshold, while neither potential recipients at potential recipient device location 350 or potential recipient device location 360 are used to determine the second optimal intermediate location, having failed to meet (or exceed) the threshold. A UAV control server (not shown in FIG. 3) may identify the optimal intermediate location 310 or the second optimal location 370, and navigational instructions based thereon may be sent to a UAV (not shown in FIG. 3).

Figure 4:
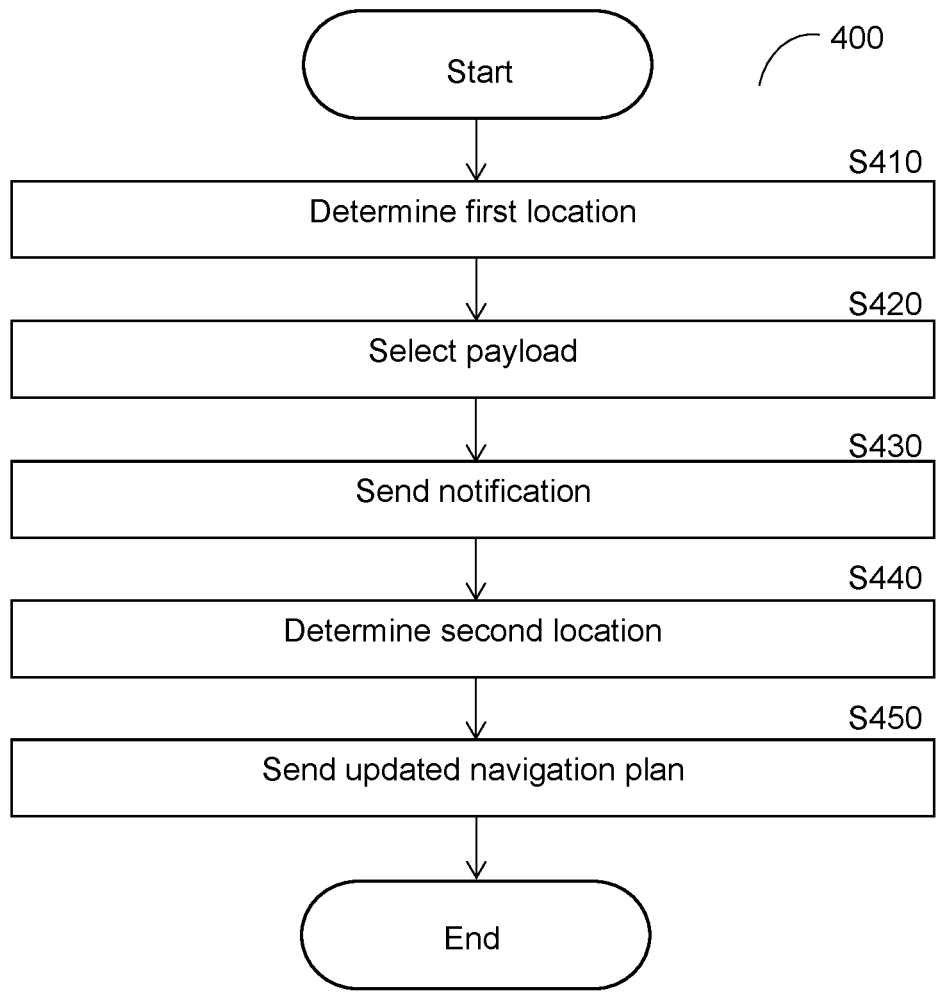
FIG. 4 is a flowchart illustrating a method for determining the optimal payload selection for payload requests based on a location according to an embodiment.

FIG. 4 is a flowchart 400 illustrating a method for location-based optimal payload selection for delivery request implemented according to an embodiment. In an embodiment, the method may be performed by the client device 180, the UAV control server 120, or the WMS 130, FIG. 1.

At S410, a first location is determined. Determining a first location may include receiving a delivery request from a potential recipient device (e.g., the potential recipient device 160, FIG. 1), and determining the first location as an address (or other geolocation) associated with the potential recipient device.

At S420, a payload is selected from a payload database based on delivery request probabilities of one or more potential recipients located within a predetermined distance from the first location (e.g., as determined based on the location of a potential recipient device operated by each potential recipient). A plurality of potential recipient device locations may be selected, by determining a distance between the first location and each of the plurality of potential recipient device locations.

A delivery request probability of at least a payload is determined for each potential recipient device associated with one of the plurality of potential recipient device locations. In an embodiment, each delivery request probability may be determined based on clustering, for example, clustering as described herein. The payload or payloads with the highest probability of being requested by a potential recipient device within a predetermined distance from the first location may be selected. Based on the payload selection, an instruction may be sent (e.g., from a client device such as the client device 180, FIG. 1) to the WMS or UAV control server to add the selected payload(s) to a payload of the UAV.

The UAV control server may then send, to the UAV, instructions to navigate to the first location. For example, the first location may be in the middle of a suburban neighborhood, where a plurality of potential recipients associated with a plurality of respective potential recipient devices reside, each potential recipient device at a respective potential recipient device location (e.g., a respective home address). A subset of the plurality of potential recipients is selected based on their respective distances from the first location. In an embodiment, based on a delivery history (available, for example, from a potential recipient database), one or more payloads may be determined, which are likely to be bought by at least by a cluster of potential recipients. A cluster includes a group of potential recipients which are likely to request delivery of a payload, based for example, on their previous delivery history, demographics, and the like.

At S430, a notification is sent to one or more potential recipient devices to initiate an electronic transaction. In an embodiment, the notification is sent to potential recipient devices whose delivery request probability is at or exceeds a predetermined threshold. In certain embodiments an incentive notification is sent to potential recipient device. An incentive notification may include an incentive such as a time limited discount on the payload. In another example, where multiple instances of the payload are available for delivery to potential recipients, the notification may include a differential incentive. A differential incentive may be, for example, a 50% discount on an item requested by a first potential recipient device, a 25% discount on an item requested by a second potential recipient device, and the like. such that the incentive diminishes as a function of time. This may increase the probability of requesting delivery by a potential recipient.

At S440, a second location is determined based on a response to the sent notification (e.g., a response from a potential recipient device). The second location is a location of a potential recipient device (e.g., the potential recipient device that sent the response). In an embodiment, a request to perform an electronic commerce transaction is received from the potential recipient device in response to the notification sent at S430. In an embodiment, S440 may further include receiving an indication that the transaction is completed such that the payload should be delivered (i.e., to the second location).

At S450, an updated navigation plan is sent to the UAV. The updated navigation plan includes instructions to navigate to the second location. In an embodiment, the instructions include navigating from the first location to the second location. In certain embodiments, the first location may be replaced by the second location such that the UAV does not navigate through the first location.

Figure 5:
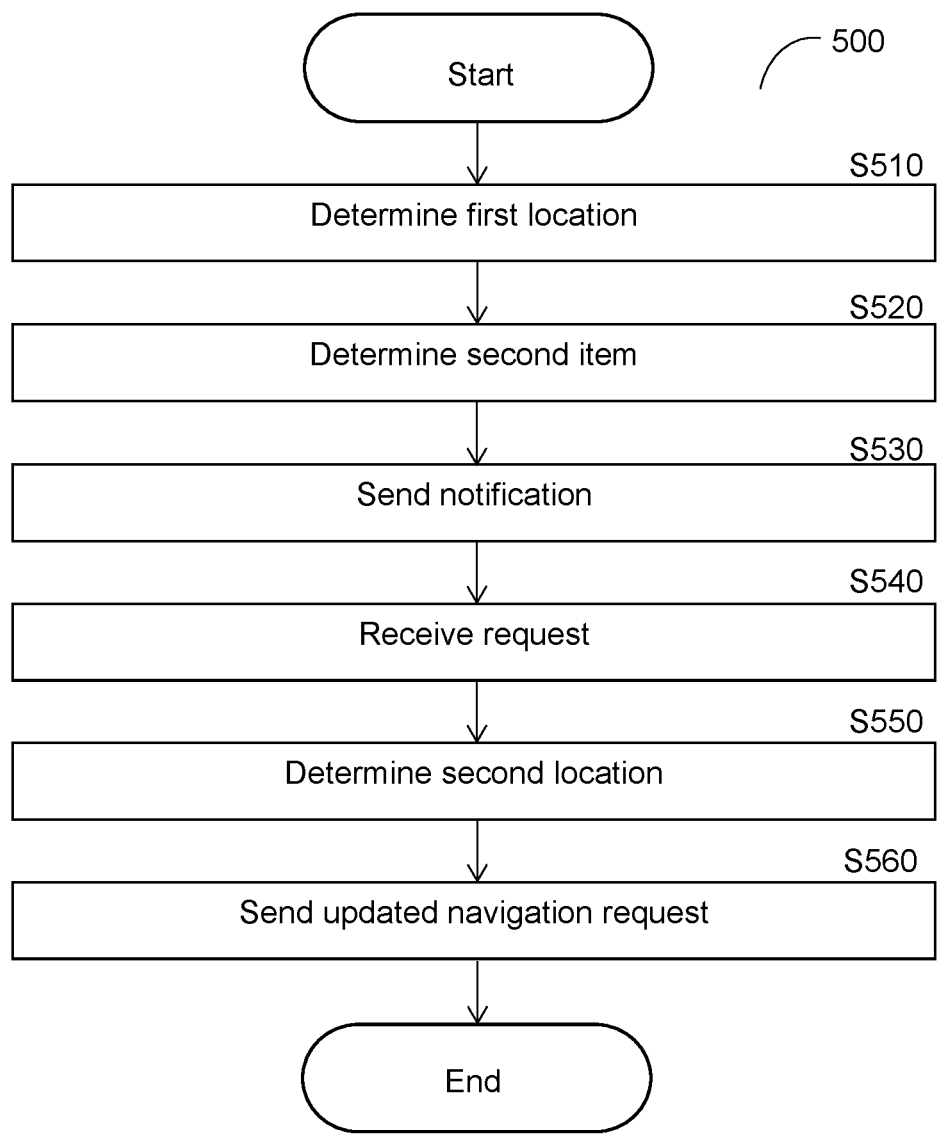
FIG. 5 is a flowchart illustrating a method for determining for increased logistical efficiency according to an embodiment.

FIG. 5 is a flowchart 500 illustrating a method for increased logistical efficiency implemented according to an embodiment.

At S510, a first location is determined based on a delivery request from a first potential recipient device of a first potential recipient. The request may include, but is not limited to, an item SKU, a delivery location, transaction information, potential recipient information related to a user of a potential recipient device, a combination thereof, and the like. In some embodiments, the request may include a location from which to pick up an item, a location to which the item should be delivered, or both.

At S520, a second item having a probability of being requested by a second potential recipient device is determined. In an embodiment, the second potential recipient device is determined to be located at a distance at or under a distance threshold from the first location (e.g., based on a location of a potential recipient device of the second user as compared to the first location). As a non-limiting example, the distance threshold may be 100 meters such that a second potential recipient device should be within 100 meters of the first potential recipient.

In certain embodiments, the second potential recipient device may be the first potential recipient. In some embodiments a plurality of second potential recipients may be determined, each having a probability to request delivery of the second item which meets or exceeds a predetermined threshold. In certain embodiments, the client device may select a plurality of second items. In such embodiments, the second items may be of the same type, or of different types.

In an embodiment, the first location may be determined without determining the second item. A notification may be sent to one or more potential recipient devices which are associated with a second potential recipient device that is likely (i.e., has a probability at or exceeding a threshold) to request delivery of an item which is supplied from the pick-up location. In certain embodiments, the notification may be sent to potential recipient devices which are within a predetermined distance from the first location. The notification may include an incentive, such as a discount. In some embodiments, the notification includes a primary time frame within which an order must be received. The notification may include a secondary time frame within the primary time frame during which the incentive is active. For example, if an order must be received within 5 minutes, and if it is received within 2 minutes, a 10% discount applies.

At S530, a notification is sent to one or more potential recipient devices, each of the one or more potential recipient devices associated with one of the at least one second potential recipient.

At optional S540, a request to deliver the second item is received from at least one second potential recipient device. The request may include a delivery location of the second potential recipient who sent the request.

At S550, a second location is determined based on a received response from a potential recipient device. In some embodiments, the second location may be determined from a potential recipient database in which a potential recipient device is associated with one or more second locations.

At S560, an updated navigation request to deliver the second item to the second location is sent (e.g., to a UAV control server such as the UAV control server 120). By adding an item to a delivery order, the UAV is able to deliver more items per trip.

As a non-limiting example, a UAV may be dispatched to deliver groceries from a big box store and to this end, receives a request to deliver the groceries to an address of a first potential recipient. A client device receiving the request send, to a UAV control server, a request to instruct a UAV to navigate to the store to load the requested grocery items. The client device may also determine that, within 150 meters of the delivery location of the first potential recipient, AA batteries are a popular payload historically delivered to a number of second potential recipients currently in that area. The client device then sends the UAV control server a second navigation instruction, the second navigation instruction including picking up a second payload of AA batteries. In some embodiments, the client device may generate a delivery request for the big box store (which employs a warehouse management system at least partially accessible by the client device). In other embodiments, the big box store may be the owner of the client device. By offering for sale the second payload to potential recipients in the area, delivery and logistics resources are better utilized to maximize sales.

In some embodiments, if the client device does not receive a request for the second payload, a second notification may be sent. The second notification may include an incentive. In certain embodiments, the second notification may be sent to a second plurality of potential recipient devices, with a lower probability to request delivery of the payload, at a greater distance from the delivery location, or both. In some embodiments, the second notification is sent if the client device does not receive a request for the second payload within a predetermined time (e.g., 5 minutes).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for optimizing drone delivery efficiency, comprising:
    determining an optimal intermediate location for an unmanned aerial vehicle (UAV) based on historical payload delivery data related to a payload carried by the UAV, wherein a distance between the optimal intermediate location and each of a plurality of potential recipient devices is less than a predetermined threshold;
    causing the UAV to navigate to the optimal intermediate location;
    sending, to each of a subset of the plurality of potential recipient devices having a predetermined level of probability of requesting the payload carried by the UAV, a notification indicating the payload carried by the UAV, wherein the predetermined level of the probability of requesting the payload carried by the UAV exceeds a predetermined threshold;
    receiving, from a first potential recipient device of the plurality of potential recipient devices, a request to deliver the payload; and
    causing the UAV to navigate from the optimal intermediate location to a location of the first potential recipient device when the request to deliver the payload is received from the first potential recipient device.

2. The method of claim 1, wherein the payload is a first payload, further comprising:
    determining a second payload for the UAV to carry based on a remaining storage capacity of the UAV when the UAV is carrying the first payload, wherein the UAV is caused to navigate to the optimal intermediate location when the second payload is stored in a storage area of the UAV.

3. The method of claim 2, further comprising:
    sending, to each of a second subset of potential recipient devices having a probability of requesting the second payload which exceeds the predetermined threshold, a notification indicating the second payload;

receiving, from a second potential recipient device of the plurality of potential recipient devices, a request to deliver the second payload; and causing the UAV to navigate to a location of the second potential recipient device when the request to deliver the second payload is received from the second potential recipient device.

4. The method of claim 3, wherein the UAV is caused to navigate to the optimal intermediate location from an origin location, wherein the UAV is caused to navigate to the location of the second potential recipient device without first navigating to the origin location.

5. The method of claim 2, wherein the second payload is determined based further on historical payload delivery data related to the second payload.

6. The method of claim 2, wherein the second payload is determined based further on at least one cluster indicated in the historical payload data, wherein each of the at least one cluster includes a type of payload of the first payload.

7. The method of claim 1, wherein the optimal delivery location is determined based further on a plurality of probabilities of requesting delivery of the payload, wherein each of the plurality of probabilities is associated with a respective potential recipient device of the plurality of potential recipient devices.

8. The method of claim 7, wherein the predetermined threshold is a first predetermined threshold, wherein the distance between the optimal intermediate location and each of the subset of the plurality of potential recipient devices is less than a respective second predetermined threshold, wherein the second predetermined threshold for each respective potential recipient device of the subset is determined based on the probability associated with the potential recipient device.

9. The method of claim 1, wherein the predetermined threshold is a first predetermined threshold, wherein a number of potential recipient devices among the plurality of potential recipient devices is above a second predetermined threshold.

10. A non-transitory computer readable medium having stored thereon instructions for causing a processing circuitry to execute a process, the process comprising:

determining an optimal intermediate location for an unmanned aerial vehicle (UAV) based on historical payload delivery data related to a payload carried by the UAV, wherein a distance between the optimal intermediate location and each of a plurality of potential recipient devices is less than a predetermined threshold;

causing the UAV to navigate to the optimal intermediate location;

sending, to each of a subset of the plurality of potential recipient devices having a predetermined level of probability of requesting the payload carried by the UAV, a notification indicating the payload carried by the UAV, wherein the predetermined level of the probability of requesting the payload carried by the UAV exceeds a predetermined threshold;

receiving, from a first potential recipient device of the plurality of potential recipient devices, a request to deliver the payload; and causing the UAV to navigate from the optimal intermediate location to a location of the first potential recipient device when the request to deliver the payload is received from the first potential recipient device.

11. A system for optimizing drone delivery efficiency, comprising:

a processing circuitry; and a memory, the memory containing instructions that, when executed by the processing circuitry, configure the system to:

determine an optimal intermediate location for an unmanned aerial vehicle (UAV) based on historical payload delivery data related to a payload carried by the UAV, wherein a distance between the optimal intermediate location and each of a plurality of potential recipient devices is less than a predetermined threshold;

cause the UAV to navigate to the optimal intermediate location;

send, to each of a subset of the plurality of potential recipient devices having a predetermined level of probability of requesting the payload carried by the UAV, a notification indicating the payload carried by the UAV, wherein the predetermined level of the probability of requesting the payload carried by the UAV exceeds a predetermined threshold;

receive, from a first potential recipient device of the plurality of potential recipient devices, a request to deliver the payload; and cause the UAV to navigate from the optimal intermediate location to a location of the first potential recipient device when the request to deliver the payload is received from the first potential recipient device.

12. The system of claim 11, wherein the payload is a first payload, wherein the system is further configured to:

determine a second payload for the UAV to carry based on a remaining storage capacity of the UAV when the UAV is carrying the first payload, wherein the UAV is caused to navigate to the optimal intermediate location when the second payload is stored in a storage area of the UAV.

13. The system of claim 12, wherein the system is further configured to:

send, to each of a second subset of potential recipient devices having a probability of requesting the second payload which exceeds the predetermined threshold, a notification indicating the second payload;

receive, from a second potential recipient device of the plurality of potential recipient devices, a request to deliver the second payload; and cause the UAV to navigate to a location of the second potential recipient device when the request to deliver the second payload is received from the second potential recipient device.

14. The system of claim 12, wherein the UAV is caused to navigate to the optimal intermediate location from an origin location, wherein the UAV is caused to navigate to the location of the second potential recipient device without first navigating to the origin location.

15. The system of claim 12, wherein the second payload is determined based further on historical payload delivery data related to the second payload.

16. The system of claim 12, wherein the second payload is determined based further on at least one cluster indicated in the historical payload data, wherein each of the at least one cluster includes a type of payload of the first payload.

17. The system of claim 11, wherein the optimal delivery location is determined based further on a plurality of probabilities of requesting delivery of the payload, wherein each of the plurality of probabilities is associated with a respective potential recipient device of the plurality of potential recipient devices.

18. The system of claim 17, wherein the predetermined threshold is a first predetermined threshold, wherein the distance between the optimal intermediate location and each of the subset of the plurality of potential recipient devices is less than a respective second predetermined threshold, wherein the second predetermined threshold for each respective potential recipient device of the subset is determined based on the probability associated with the potential recipient device.

19. The system of claim 11, wherein the predetermined threshold is a first predetermined threshold, wherein a number of potential recipient devices among the plurality of potential recipient devices is above a second predetermined threshold.

\* \* \* \* \*